US012705332B2

(12) United States Patent
Peresse et al.

(10) Patent No.: US 12,705,332 B2
(45) Date of Patent: Aug. 11, 2026

(54) METHOD FOR VERIFYING THE AUTHENTICITY OF AN ACTUATOR COMMAND

(71) Applicants: RENAULT S.A.S, Boulogne Billancourt (FR); NISSAN MOTOR CO., LTD., Kanagawa-ku (JP)

(72) Inventors: Marc Peresse, Cedex Guyancourt (FR); Redouane Soum, Guyancourt (FR)

(73) Assignees: RENAULT S.A.S, Boulogne Billancourt (FR); NISSAN MOTOR CO., LTD., Kanagawa-ku (JP)

( * ) Notice: Subject to any disclaimer, the term of this patent is extended or adjusted under 35 U.S.C. 154(b) by 160 days.

(21) Appl. No.: 18/546,034

(22) PCT Filed: Jan. 31, 2022

(86) PCT No.: PCT/EP2022/052161
§ 371 (c)(1),
(2) Date: Aug. 10, 2023

(87) PCT Pub. No.: WO2022/171468
PCT Pub. Date: Aug. 18, 2022

(65) Prior Publication Data

US 2024/0320316 A1 Sep. 26, 2024

(30) Foreign Application Priority Data

Feb. 12, 2021 (FR) ...................................... 2101359

(51) Int. Cl.
*G06F 21/00* (2013.01)
*G06F 21/44* (2013.01)

(52) U.S. Cl.
CPC .................................. *G06F 21/44* (2013.01)

(58) Field of Classification Search
CPC ..................................................... G06F 21/44
See application file for complete search history.

(56) References Cited

U.S. PATENT DOCUMENTS

2014/0196111 A1 7/2014 Kesavan et al.
2014/0333231 A1* 11/2014 Desbiolles ............. H02P 31/00 318/3

(Continued)

FOREIGN PATENT DOCUMENTS

CN 107578231 B * 7/2023 .......... G06F 21/602
EP 2 775 421 A1 9/2014
WO WO-2019025749 A1 * 2/2019 ............ G06F 21/33

OTHER PUBLICATIONS

International Search Report mailed on May 3, 2022 in PCT/EP2022/052161 filed on Jan. 31, 2022 (3 pages).

(Continued)

*Primary Examiner* — Rodman Alexander Mahmoudi
(74) *Attorney, Agent, or Firm* — Oblon, McClelland, Maier & Neustadt, L.L.P.

(57) ABSTRACT

A method for verifying the authenticity of a command from an actuator controlled by an electronic control unit connected to a multimedia system including: a touch-sensitive display to receive a user command and to display information relating to the actuator command, an operating system to enable an external communication device to be remotely displayed on the touch-sensitive display, and an authenticated secure environment to provide a higher level of security than the security level of the operating system. The authenticated secure environment includes a support controller to detect a user command on the touch-sensitive display. The method includes: signing off a user command by the authenticated secure environment, the user command corresponding to physical activation of an area of the display; transmitting, by the operating system, the signed-off command to the electronic control unit; verifying the sign-off by the electronic control unit; executing the user command by the actuator.

8 Claims, 5 Drawing Sheets

(56) References Cited

U.S. PATENT DOCUMENTS

| | | | |
|---|---|---|---|
| 2016/0020906 | A1 | 1/2016 | Nolte et al. |
| 2017/0142078 | A1 | 5/2017 | Lee |
| 2021/0126795 | A1 | 4/2021 | Blackie et al. |

OTHER PUBLICATIONS

French Preliminary Search Report issued Oct. 5, 2021 in French Patent Application No. 2101359 filed Feb. 12, 2021, 14 pages with Written Opinion (with Translation of Category of Cited Documents).

Prakash Ranganathan et al., "OTA and Hardware Security for Vehicles", University of North Dakota, VM-I-185RI, vol. vm, Jun. 15, 2020 (Jun. 15, 2020), pp. 1-4.

Lee Sungbum et al., "TEE based session key establishment protocol for secure infotainment systems", Design Automation for Embedded Systems, Amsterdam, NL, vol. 22, No. 3, Jun. 2, 2018 (Jun. 2, 2018), pp. 215-224.

* cited by examiner

METHOD FOR VERIFYING THE AUTHENTICITY OF AN ACTUATOR COMMAND

The invention relates to a method for verifying the authenticity of a command of an actuator, and also to a system for commanding an actuator. The invention is particularly adapted to the field of automobile vehicles, but may also be applied to other fields, notably home automation systems.

"Infotainment" has become a major selling point for automobile vehicles. Users wish to able to access, from a dashboard of the vehicle, various multimedia content or various telecommunications or navigation services. Multimedia systems, also known by the acronym "IVI" (In-Vehicle Infotainment), have thus been developed to equip the vehicles.

Solutions have also been provided to give the user access to the content of an external communication device, for example a smartphone or a tablet, on the dashboard. The dashboard is then a remote screen from which the user can access his/her applications with a usual interface, so that they are not put off by the change of interface.

The user may thus access the content of his/her external communication device (for example smartphone) on the touch screen of the dashboard, and control certain parts of the vehicle, for example the driver assistance system, the comfort (seats, heating), the configuration of the automatic gear box, the sound volume, etc.

The multimedia system furthermore comprises an integrated operating system allowing the display of an external communication device to be transferred onto the touch-sensitive display of the multimedia system. Android Auto or CarPlay are examples of such operating systems.

However, such a connectivity leads to an increase in the attack surface. Indeed, connecting the multimedia system to an external communications network, for example the Internet, via open systems, as some operating systems are, may render the communications system vulnerable to cyberattacks.

Furthermore, the use of "open" systems such as the OS operating system of the IVI may pose security problems. For example, some manufacturers use the Android operating system which allows the installation of third-party applications through the Android store. These applications represent a potential threat. Also, these open systems usually require a connection to the internet, which is typically provided by the vehicle itself via a dedicated control unit.

However, in the case of an attack of the multimedia system, all of the available functions may be used by the attacker, including the most critical functions, such as the functions relating to the control of the vehicle.

Solutions do exist for guaranteeing the confidentiality of the data input into a smartphone, used for example for banking applications. The operating system comprises a secure part. The application is executed by the operating system.

When the user has to input a password, the secure part takes over and encrypts the password. At the end of the authentication procedure, the secure part transmits the encrypted password to the operating system. Thus, in the case of a cyberattack on the operating system, the attacker cannot be in possession of the password.

The integrated security systems currently in smartphones also prevent an attacker from guessing the secret code by means of a screen tapping analysis, correlated with an analysis of the display.

The known solutions of the prior art, disclosed for example in the patent application US2005/0275661 A1 or US 2016/0255073 A1, thus allow the confidentiality of the data exchanged to be guaranteed. These solutions are not however aimed at guaranteeing the authenticity (or integrity) of the data exchanged.

However, in the multimedia systems applied to sensitive fields such as the automobile or the home automation fields, it is important to ensure that the command is indeed linked to a user interaction, and not to code which is running without a user interaction.

There thus exists a need for a method and a device capable of guaranteeing that the commands from the multimedia system are indeed initiated "physically" by the user, and that in the case where the operating system is compromised, it is not possible for the operating system to initiate such actions.

One subject of the invention is therefore a method for verifying the authenticity of a command of an actuator able to be controlled by an electronic control unit, the electronic control unit being connected to a multimedia system comprising:

- a touch-sensitive display configured for receiving a user command, and for displaying information relating to the command of the actuator,
- an operating system configured for transferring the display from an external communication device onto the touch-sensitive display of the multimedia system, and
- a trusted execution environment configured for providing a higher level of security than the level of security of the operating system, the trusted execution environment comprising a tap controller configured for detecting a user command on the touch-sensitive display, the method comprising:

- a) a signature of a user command by the trusted execution environment, said user command corresponding to a physical activation of at least one area of the display;
- b) a transmission by the operating system of the signed command to the electronic control unit;
- c) a verification of the signature by the electronic control unit;
- d) an execution of the user command by the actuator.

Advantageously, the method comprises beforehand:

- a') a detection, by the trusted execution environment, of the user command;
- a") a re-transmission of the command from the trusted execution environment to the operating system;
- a"') an update of the display on the touch-sensitive display as a function of the user command.

Advantageously, the trusted execution environment comprises an authentication component configured for controlling secure functions relating to the command of the actuator, and for date stamping the user command carried out on the touch-sensitive display, the command signature step a) comprising:

- i) a receipt, by the authentication component, of a vehicle function request sent out by the operating system, and
- ii) a signature of the command if the period between the time of receipt of the vehicle function request and the time of the user command on the touch-sensitive display is less than a predetermined value.

Advantageously, the trusted execution environment comprises an authentication component configured for controlling secure functions relating to the command of the actuator;

- the command signature step a) comprising beforehand a detection, by the authentication component, of a secure start of action frame relating to the user command, in response to the activation of the area of the display, so as to display a vehicle interaction menu;

the authentication component generating, in response to the step b) for transmission by the operating system of the signed command, a secure end of action frame relating to the user command.

Advantageously, the operating system regularly sends a screen grab, to the trusted execution environment, of the content specific to the operating system, and the trusted execution environment superposes the vehicle interaction menu onto the screen grab received from the operating system.

Advantageously, the actuator is configured for executing a command for controlling the comfort of an automobile vehicle, for controlling the configuration of the automatic gearbox of an automobile vehicle or a driver assistance function of an automobile vehicle.

Advantageously, the actuator is configured for executing a command from a home automation system.

Advantageously, the external communication device is a smartphone or a tablet.

Advantageously, the physical activation of at least one area of the touch-sensitive display comprises the tapping by the user of an area of the touch-sensitive display.

The invention also relates to a system for commanding an actuator able to be controlled by an electronic control unit, the electronic control unit being connected to a multimedia system comprising:

a touch-sensitive display configured for receiving a user command, and for displaying information relating to the command of the actuator, an operating system configured for transferring the display from an external communication device onto the touch-sensitive display of the multimedia system, and a trusted execution environment configured for providing a higher level of security than the operating system, the trusted execution environment comprising a tap controller configured for detecting a user command on the touch-sensitive display, the system being furthermore configured for implementing the aforementioned method.

Other features, details and advantages of the invention will become apparent upon reading the description presented with reference to the appended drawings given by way of example and which show, respectively:

FIG. 1 illustrates the overall architecture of the system for implementing the method according to the invention.

The multimedia system IVI comprises a touchscreen SC in order to display the navigation information, together with any type of multimedia content such as images, videos. The touchscreen SC is also configured for reproducing the display of a smartphone of the user.

The multimedia system IVI is composed of two systems running concurrently, namely an operating system OS configured for transferring the display from an external communication device onto a touch-sensitive display of the multimedia system, together with a trusted execution environment TEE.

The trusted execution environment TEE is configured for providing a higher level of security than the level of security of the operating system, by way of its capacity to partially or totally isolate certain peripherals (memories, screens etc.).

In the system according to the invention, the tap controller TC (or "driver") detects a user tap on the touch-sensitive display screen SC and converts the tap into a command interpretable by the trusted execution environment TEE.

The parts of the user interface identified as sensitive, namely those that allow an interaction with the vehicle, are executed by an authentication component CA integrated into the trusted execution environment TEE.

If the user interacts with the interface so as to request the control of certain commands of the vehicle, the authentication component CA then generates commands signed by means of a security key. The trusted execution environment TEE guarantees the confidentiality of this key by way of the isolation capacities of the trusted execution environment TEE.

The trusted execution environment TEE transmits the commands to the operating system OS which will send the command to the electronic control unit UC, for example the onboard computer (BCM for Body Control Module), or the system which manages the driver assistance system (ADAS for Advanced Driver Assistance Systems). The transmission is carried out over a data link, for example a CAN data bus or an $I^2C$ bus.

The method is described in more detail with reference to FIGS. 2 to 5.

The method comprises four steps.

In a first step a), the trusted execution environment TEE signs the user command.

The signature is carried out by means of a cryptographic method known to those skilled in the art. The cryptographic method may be of the symmetric type, with shared key (for example implementing the AES, DES or Triple DES algorithm), or else asymmetric type with the use of public and private keys (for example implementing the RSA algorithm).

In a second step b), the operating system OS transmits the signed command to the electronic control unit UC.

In a third step c), the electronic control unit UC verifies the signature. In a fourth step d) the user command is executed.

Figure 1:
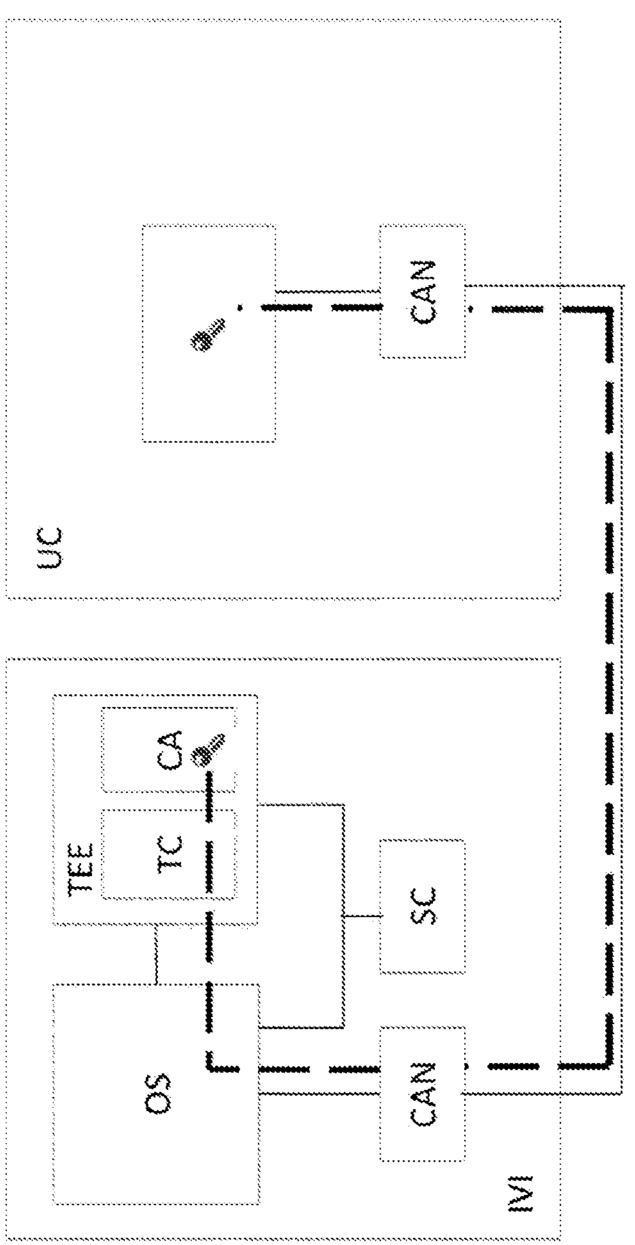
FIG. 1 shows a system according to the invention.
Figure 2:
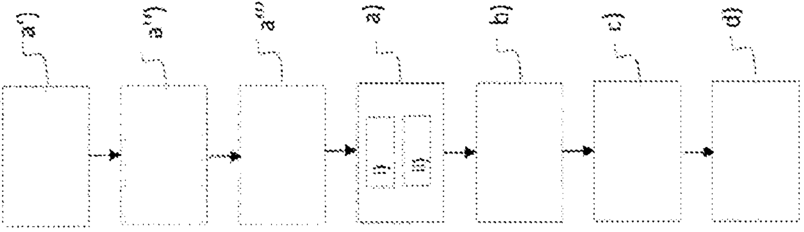
FIG. 2 shows the various steps of the method according to the invention.
Figure 3:
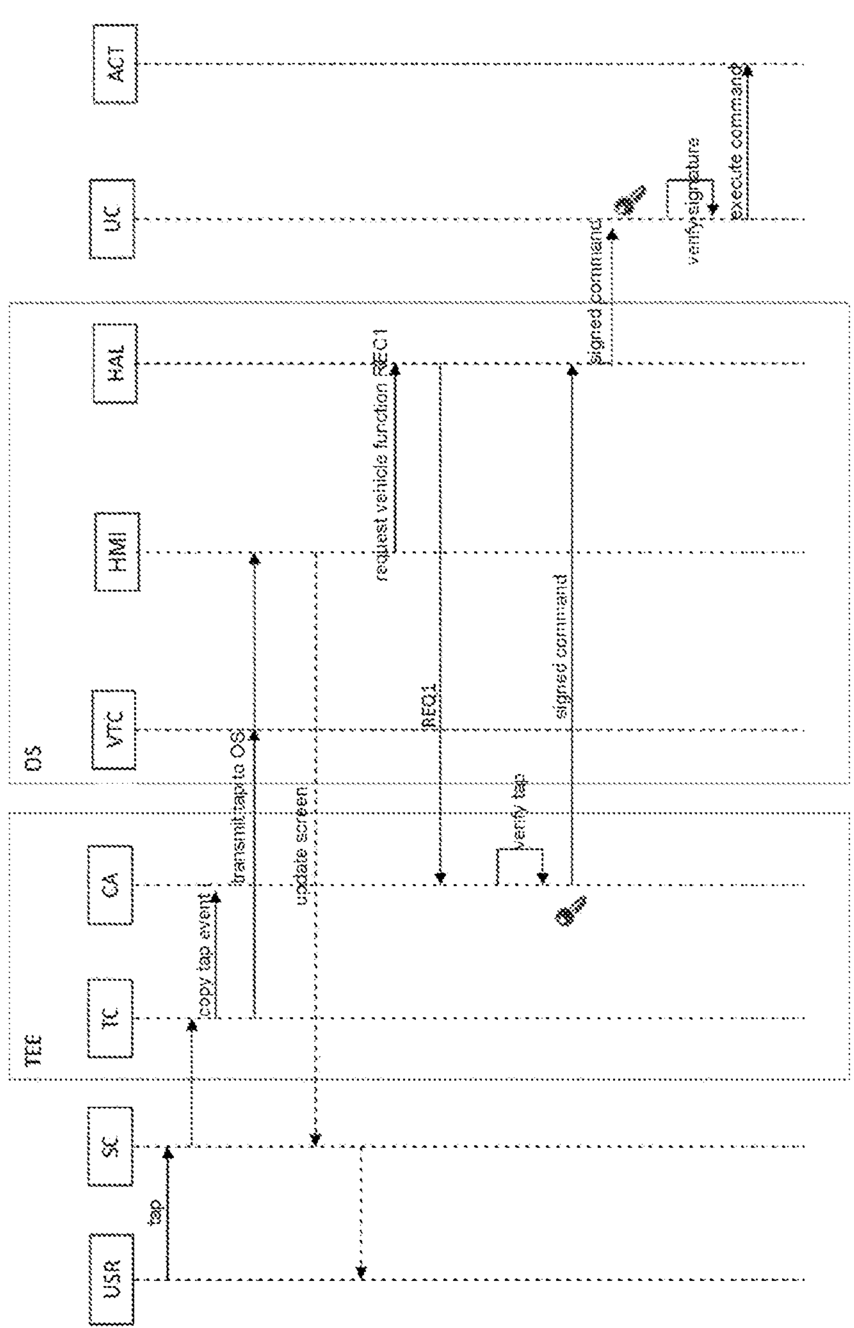
FIGS. 3 and 4 show two embodiments of the method according to the invention.

FIG. 3 illustrates a first embodiment of the method according to the invention.

The user USR performs a physical activation (screen tap) of at least one area of the display screen SC, for example by tapping on the screen in order to control a function of the vehicle, or else to browse a menu specific to a function of the vehicle.

The trusted execution environment TEE detects the user command (step a')).

The tap information is transmitted by the screen to the tap controller TC which interprets the activation of the area of the screen SC in order for the command to be interpretable by the operating system OS (step a'')).

Furthermore, the tap controller TC transmits, to the authentication component CA, a "copy" of the tap event, typically the area where the tap has been applied and with what pressure. The authentication component CA subsequently saves this event with a timestamp.

The trusted execution environment TEE is particularly difficult to attack owing to its isolation and its limited size, thus reducing the attack surface exposed to the operating system OS. The transmission of a copy of the tap event by the attacker, without them really having tapped on the display screen SC, is therefore difficult to achieve.

The HMI (Human Machine Interface) part of the operating system OS updates the display according to the area activated by the user. For example, the HMI part progressively updates the display of the menu as the user browses a menu, or else selects a command (step a''')).

The operating system OS itself receives the events from the tap controller TC, and it updates its display. The trusted execution environment TEE therefore behaves as a virtual tap controller, and relays the events received from the physical tap controller.

The HMI part of the operating system OS transmits the request for access to a function of the vehicle REQ1, which corresponds to the user command, to a HAL (hardware abstraction layer) module of the operating system OS.

The HAL module is an interface which defines the properties of the vehicle that the manufacturer or the OEM (original equipment manufacturer) may implement. The HAL module contains property metadata. For the heating, ventilation and air conditioning (HVAC), the properties may for example be the adjustment of the temperature by zone, or the control of the recirculation by zone.

The HAL module defines whether the properties are read only, write only or read and write.

In response to the request for access made by the HMI part, the HAL module transmits the request for access to a function of the vehicle REQ1 to the authentication component CA (sub-step i)).

In the sub-step ii), the authentication component CA validates the command if the period between the time of receipt of the vehicle function request REQ1 and the time of the user command on the touch-sensitive display screen SC (i.e. the time of tap) is less than a predetermined value (for example a few milliseconds).

In the affirmative, the authentication component CA signs the user command, which then guarantees the authenticity of the command. Indeed, the trusted execution environment TEE has few interactions with the operating system OS of the multimedia system IVI, which thus protects it from a malicious attack trying to take control of the operating system OS or even of the onboard computer of the vehicle.

The signed command is transmitted to the HAL module, which retransmits it to the electronic control unit UC, for example the onboard computer BCM or the system which manages the driver assistance system ADAS. It is essential that the electronic unit UC does not receive a command initiated by a non-authenticated user. The electronic unit UC thus verifies the signature.

The digital signature of the command by the authentication component CA, and the verification of the signature by the electronic unit UC use an asymmetric or symmetric cryptography mechanism. This mechanism allows the authenticity of the sender to be ensured.

Once the electronic unit UC has verified the authenticity of the command, the actuator ACT executes the user command.

According to this first embodiment, the operating system OS keeps the full control of the display on the display screen SC: the HMI part of the operating system OS carries out the updates of the display screen SC. In this case, there exists a risk of an attacker "overloading" the real interface with the aim of pushing the user to interact with the screen, and hence to trigger vehicle commands without his/her knowledge.

Figure 4:
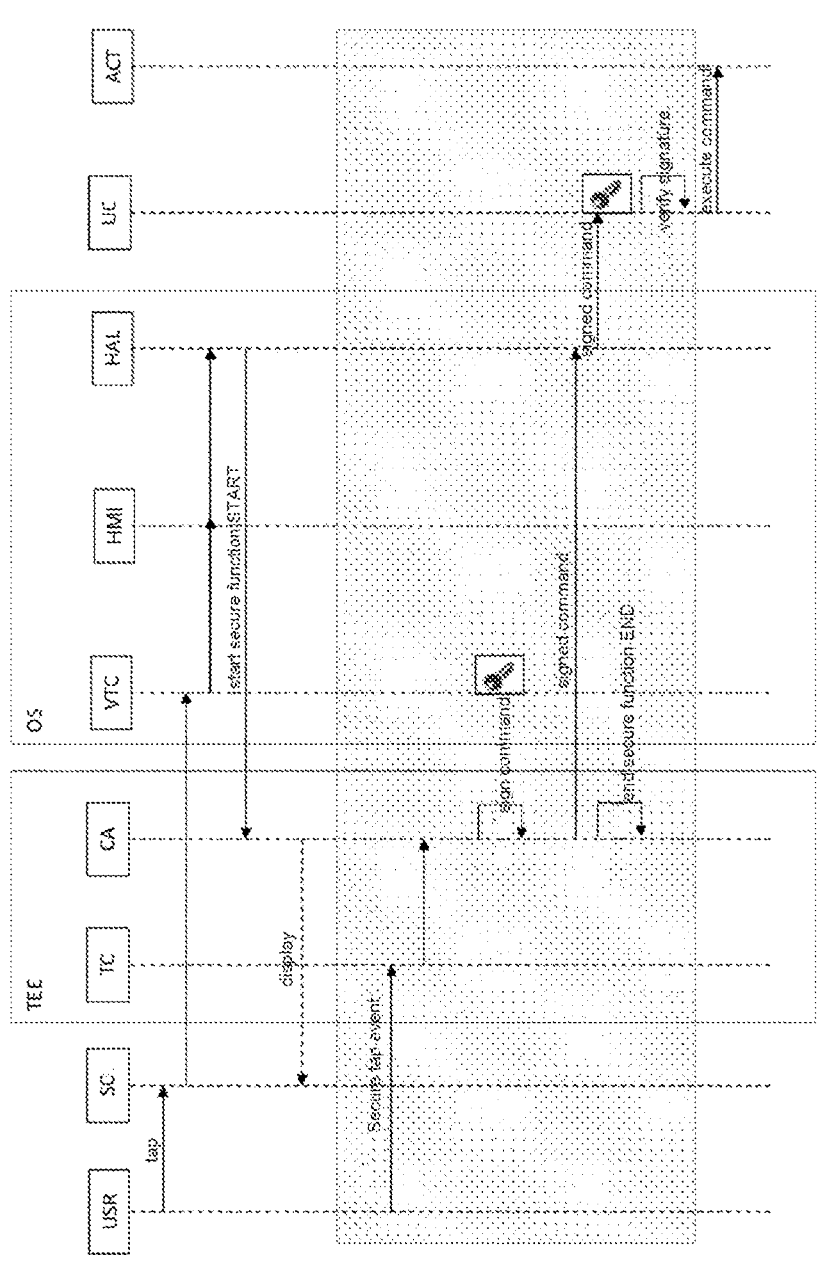

FIG. 4 illustrates a second embodiment of the method according to the invention, in which the trusted execution environment TEE is in control not only of the touch sensitive layer of the display screen SC (upper layer), but also of the display layer of the display screen SC (lower layer).

In the second embodiment, the activation of an area of the screen is transmitted directly to the operating system OS.

In this embodiment, when the user, browsing the menus, selects a secure command of the vehicle (for example HVAC or ADAS), the operating system OS sends the corresponding command, for example "start HVAC" or "start ADAS", asking the trusted execution environment TEE to take over the display screen SC so as to display the menu in question.

If the user taps on vehicle commands, the trusted execution environment TEE sends the encrypted commands to the operating system OS for transfer to the electronic unit UC.

The authentication component receives a frame START to begin a secure action relating to the user command, in response to the activation of the area of the display.

When the trusted execution environment TEE receives the frame "START", the trusted execution environment TEE becomes the only element totally controlling the display screen SC. It is the trusted execution environment TEE that supplies the content on the screen. However, the trusted execution environment TEE does not dispose of the information from the operating system OS, such as the time, the notifications, etc.

In order to maintain unity in the user experience, the operating system OS may regularly send a screen grab of what it wishes to display to the trusted execution environment TEE.

The trusted execution environment TEE will superpose the part that it has to supply as content (i.e. the vehicle interaction menu, for example HVAC) onto the screen grab received from the operating system OS.

In FIG. 4, the framed part is entirely managed by the trusted execution environment TEE, which increases the level of security with respect to the first embodiment.

The HAL module transmits the secure function start information START to the authentication component, hence the user tap is considered by the tap controller TC as being a secure tap.

After having detected the secure tap event corresponding this time to a specific command of the secure command (for example ADAS or HVAC), the authentication component signs the command and transmits it to the HAL module, which re-transmits it to the electronic unit UC.

After having transmitted the signed command to the HAL module, the authentication component CA generates a secure action end frame END relating to the user command. The frame END is therefore sent when the user decides to "exit" from the screen displayed by the trusted execution environment TEE.

The electronic unit UC subsequently verifies the signature of the signed command and, if the command is authenticated, namely the command is indeed generated by the trusted execution environment TEE and hence really corresponds to a user interaction, the electronic unit UC executes the command by means of the actuator ACT.

This embodiment therefore has two advantages. Firstly, the security is improved because only the trusted execution environment TEE displays content on the screen. Secondly, the trusted execution environment TEE only controls the tap controller TC when it is necessary (whereas, in the first embodiment, there is an additional latency).

Figure 5:
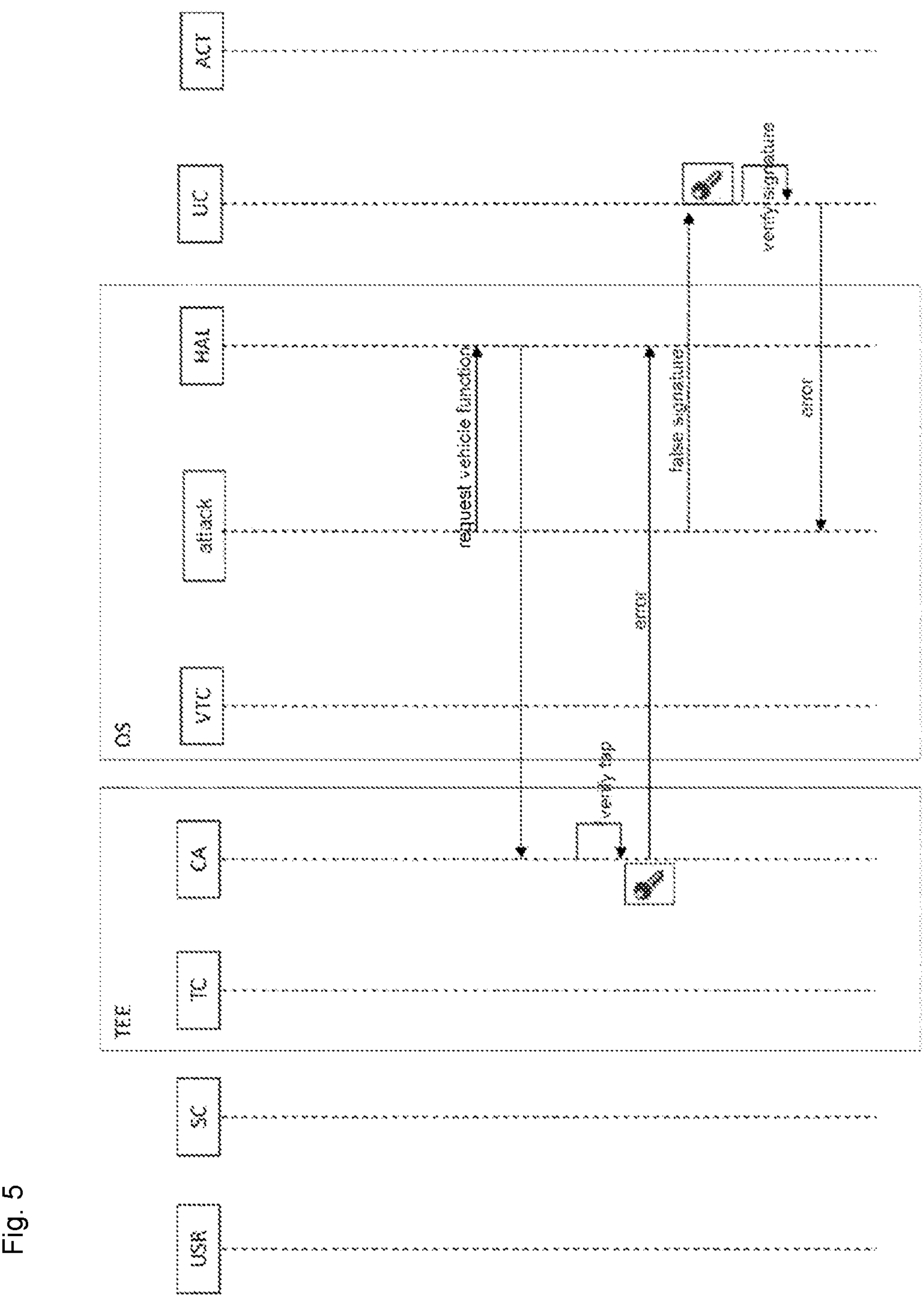
FIG. 5 shows the application of the method according to the first embodiment, in response to a cyberattack.

FIG. 5 illustrates one example of a malicious attack trying to take control of a function of the vehicle, related to the first embodiment.

The attacker emulates, via the operating system OS, an actuator command function. In response to a function request transmitted by the HMI part, the HAL module sends the corresponding information to the authentication component CA.

The authentication component CA verifies whether the command corresponds to a physical activation by a user, for example a tap on the screen. For this purpose, the authentication component CA verifies whether the user has interacted with the screen over a predetermined period preceding the tap verification (for example over the last X milliseconds).

In the framework of a malicious attack, the user command is not timestamped, therefore the authentication component CA sends an error message to the HAL module. At the same time, the attacker may generate a false signature. In both cases, the electronic unit UC verifies the signature, and sends back an error message, since the command is not authenticated.

With this solution, it is therefore impossible for an attacker having taken control of the operating system OS to use the vehicle commands without taking control of the trusted execution environment TEE. However, taking control of the trusted execution environment TEE is complex, owing to its isolation with respect to the usual attack surface of the operating systems, and owing to its limited size.

The invention thus allows the level of security of certain user interfaces to be increased by creating a trusted chain between the action on the screen and the action initiated by the multimedia system, while at the same time limiting the impact on the user experience (no need to have another screen).

The invention is not limited to the automobile field. It may be used in any system providing a user interaction requiring a certain level of security, where a remote access to the exposed functions may be attractive for an attacker.

For example, the method may be applied to a home automation system with a user interface available inside the house, and connected to a not very secure external communicating device, for example a smartphone. Thus, the exposed functions, for example the control of the windows, may be protected, such that in the case of the control screen being compromised, no action can be initiated without physical access to the screen of the home automation system.

The invention claimed is:

1. A method for verifying authenticity of a command of an actuator configured to be controlled by an electronic control unit, the electronic control unit being connected to a multimedia system comprising:
- a touch-sensitive display configured to receive a user command, and to display information relating to the command of the actuator,
- an operating system configured to transfer display from an external communication device onto the touch-sensitive display of the multimedia system, and
- a trusted execution environment configured to provide a higher level of security than a level of security of the operating system, the trusted execution environment comprising a tap controller configured to detect the user command on the touch-sensitive display, the method comprising:
- signing the user command by the trusted execution environment, the user command corresponding to a physical activation of at least one area of the touch-sensitive display;
- transmitting, by the operating system, the signed user command to the electronic control unit;
- verifying a signature of the signed user command by the electronic control unit; and
- executing the user command by the actuator,
- wherein the method comprises, before the signing,
  - detecting, by the trusted execution environment, the user command;
  - transmitting the user command from the trusted execution environment to the operating system; and
  - updating the display on the touch-sensitive display as a function of the user command,
  - the trusted execution environment comprises an authentication component configured to control secure functions relating to the command of the actuator, and to date stamp the user command carried out on the touch-sensitive display, and
  - the signing of the user command comprises:
  - receiving, by the authentication component, a vehicle function request sent out by the operating system, and
  - signing the user command when a period between a time of receipt of the vehicle function request and a time of the user command on the touch-sensitive display is less than a predetermined value,
  - or
  - wherein
  - the trusted execution environment comprises the authentication component configured to control secure functions relating to the command of the actuator,
  - the method comprises, before the signing, detecting, by the authentication component, a secure start of an action frame relating to the user command, in response to the physical activation of the area of the display, so as to display a vehicle interaction menu, and
  - the authentication component generates, in response to the transmitting by the operating system of the signed user command, a secure end of action frame relating to the user command.

2. The method as claimed in claim 1, wherein the operating system regularly sends a screen grab, to the trusted execution environment, of content specific to the operating system, and the trusted execution environment superposes the vehicle interaction menu onto the screen grab received from the operating system.

3. The method as claimed in claim 1, wherein the actuator is configured to execute a command to control comfort of an automobile vehicle, to control a configuration of an automatic gearbox of an automobile vehicle or of a driver assistance function of an automobile vehicle.

4. The method as claimed in claim 1, wherein the actuator is configured to execute a command from a home automation system.

5. The method as claimed in claim 1, wherein the external communication device is a smartphone or a tablet.

6. The method as claimed in claim 1, wherein the physical activation of at least one area of the touch-sensitive display comprises tapping by a user of an area of the touch-sensitive display.

7. An actuator command system configured to be controlled by an electronic control unit, the electronic control unit being connected to a multimedia system comprising:
- a touch-sensitive display configured to receive a user command, and to display information relating to the command of the actuator;

an operating system configured to transfer display from an external communication device onto the touch-sensitive display of the multimedia system; and a trusted execution environment configured to provide a higher level of security than a level of security of the operating system, the trusted execution environment comprising a tap controller configured to detect the user command on the touch-sensitive display, wherein the trusted execution environment signs the user command, the user command corresponding to a physical activation of at least one area of the touch-sensitive display, the operating system transmits the signed user command to the electronic control unit, and the electronic control unit verifies a signature of the signed user command, wherein before signing, the user command is detected by the trusted execution environment;

the user command is transmitted from the trusted execution environment to the operating system; and the display on the touch-sensitive display is updated as a function of the user command, the trusted execution environment comprises an authentication component configured to control secure functions relating to the command of the actuator, and to date stamp the user command carried out on the touch-sensitive display, and signing of the user command comprises:

receiving, by the authentication component, a vehicle function request sent out by the operating system, and signing the user command when a period between a time of receipt of the vehicle function request and a time of the user command on the touch-sensitive display is less than a predetermined value, or wherein the trusted execution environment comprises the authentication component configured to control secure functions relating to the command of the actuator, before signing, the authentication component detects a secure start of an action frame relating to the user command, in response to the physical activation of the area of the display, so as to display a vehicle interaction menu, and the authentication component generates, in response to transmitting by the operating system of the signed user command, a secure end of action frame relating to the user command, the actuator command system comprising:

circuitry configured to execute the user command.

8. A method for verifying authenticity of a command of an actuator configured to be controlled by an electronic control unit, the electronic control unit being connected to a multimedia system comprising:

a touch-sensitive display configured to receive a user command, and to display information relating to the command of the actuator, an operating system configured to transfer display from an external communication device onto the touch-sensitive display of the multimedia system, and a trusted execution environment configured to provide a higher level of security than a level of security of the operating system, the trusted execution environment comprising a tap controller configured to detect the user command on the touch-sensitive display, the method comprising:

signing the user command by the trusted execution environment, the user command corresponding to a physical activation of at least one area of the touch-sensitive display;

transmitting, by the operating system, the signed user command to the electronic control unit;

verifying a signature of the signed user command by the electronic control unit; and executing the user command by the actuator, wherein the trusted execution environment comprises an authentication component configured to control secure functions relating to the command of the actuator, and the method further comprises, before the signing, detecting, by the authentication component, a secure start of an action frame relating to the user command, in response to the physical activation of the area of the display, so as to display a vehicle interaction menu.

* * * * *